United States Patent [19]
Eichberger et al.

[11] Patent Number: 5,815,934
[45] Date of Patent: Oct. 6, 1998

[54] PLANAR CHIP EJECTION CASSETTE

[75] Inventors: Gert Eichberger, Kronberg; Hans-Jurgen Kriegel, Netzbach; Karl Schmid, Idstein, all of Germany

[73] Assignee: Black & Decker Inc., Newark, Del.

[21] Appl. No.: 823,289

[22] Filed: Mar. 21, 1997

Related U.S. Application Data

[63] Continuation of Ser. No. 620,961, Mar. 22, 1996, abandoned.

[30] Foreign Application Priority Data

Mar. 24, 1995 [DE] Germany .................. 195 12 262.3

[51] Int. Cl.⁶ ..................................................... B29C 1/10
[52] U.S. Cl. ........................................... 30/475; 144/252.1
[58] Field of Search .............................. 30/124, 475, 476, 30/477; 144/252.1; 451/453

[56] References Cited

U.S. PATENT DOCUMENTS

| | | | |
|---|---|---|---|
| 1,281,207 | 10/1918 | Richens . | |
| 1,980,056 | 11/1934 | Hedeby | 30/475 |
| 2,395,158 | 2/1946 | Yandell | 30/477 |
| 2,583,637 | 2/1952 | Draper . | |
| 2,774,399 | 12/1956 | Emmons | 30/475 |
| 2,871,897 | 2/1959 | Hesse et al. . | |
| 3,126,929 | 3/1964 | Pedersen | 30/475 |
| 3,407,857 | 10/1968 | Bentley | 30/475 |
| 4,414,743 | 11/1983 | Pioch et al. | 30/124 |
| 4,601,104 | 7/1986 | Zaiser et al. | 30/475 |
| 5,146,682 | 9/1992 | Blöchle et al. | 30/124 |
| 5,383,275 | 1/1995 | Hild et al. | 30/475 |

FOREIGN PATENT DOCUMENTS

| | | |
|---|---|---|
| 0153578 | 9/1985 | European Pat. Off. . |
| 1080764 | 4/1960 | Germany . |
| 1628946 | 11/1971 | Germany . |
| 2939598 | 4/1981 | Germany . |
| 3542263 | 6/1987 | Germany . |
| 3703063 | 6/1988 | Germany . |
| 4134768 | 4/1993 | Germany . |

*Primary Examiner*—Hwei-Siu Payer
*Attorney, Agent, or Firm*—Dennis A. Dearing; John D. Del Ponti; Charles E. Yocum

[57] ABSTRACT

A handheld powered planer is provided with a receiving chamber (25) with a chips redirecting surface (51) next to the drum compartment (18) for the cutter drum (15). The receiving chamber (25) is connected via an inlet opening (28) to the drum compartment (18) and via a lateral outlet opening (26, 27) to the outside. The chips redirecting surface (51) is inclined in an ascending manner in the direction of the outlet opening. Air passage openings (53) are located in the inclined chips redirecting surface (51) and are connected via an air channel (30) to the motor compartment (19) of the planer housing (1) so that an air flow from the fan wheel (11) of the drive motor (8) passes through the air passage openings (53) and flows in the direction of the outlet openings (26, 27). Chip removal is significantly improved as a result of this.

7 Claims, 7 Drawing Sheets

PLANAR CHIP EJECTION CASSETTE

This application is a continuation of application Ser. No. 08/620,961, filed Mar. 22, 1196, now abandoned.

The invention relates to a handheld powered planer with a planer housing in the drum compartment of which a cutter drum is disposed which extends with a portion of its periphery through a recess in the base plate arrangement which, in operation, comes to rest on the workpiece and the shaft of which is coupled to the drive motor which is located in a motor compartment of the planer housing having at least one fan wheel and which is provided with a receiving chamber which extends substantially parallel to the shaft which is open whilst forming an outlet opening at least to one side of the planer housing and is provided with an elongated inlet opening which connects the receiving chamber to the drum compartment for the intake of chips produced during the planing operation with a chips redirecting surface being provided in the receiving chamber which is at least approximately opposite the inlet opening in the direction of the chips intake and which runs at least over a part section at an inclination in relation to the shaft.

On a known planer of this type (U.S. Pat. No 3,407,857) the receiving chamber which extends parallel to the spindle accommodates a chips ejection insert which can be inserted selectively in such a way into the receiving chamber that an ejection of chips can be carried out on one side or the other of the planer housing and which is provided on its upper side with a chips redirecting surface. This chips redirecting surface runs from its inner end substantially continuously in an ascending and slightly curved manner to the outlet opening. The receiving chamber with the chips ejection insert provided with the chips redirecting surface is located in the planer housing above the cutter drum. From this chips taken from the workpiece and flung upwards strike the chips redirecting surface and are directed back from this in the direction of the outlet opening and thus removed from the planer housing.

Thus on the known planer the chips are thrust against the chips redirecting surface with the kinetic energy supplied to it from the cutter drum and the air flow generated by this which results in a portion of the kinetic energy of the chips being consumed so that the remaining kinetic energy is frequently no longer sufficient for conveying the chips out of the planer housing. Consequently these chips are either thrust around additionally inside the receiving chamber or it can even happen that as a result of their striking against the chips redirecting surface they adhere to this surface. This then results in the chips redirecting surface rapidly becoming ineffective as the chips which are subsequently brought to it are then reflected in a highly uncontrolled manner.

The object of the invention is to improve significantly the efficiency of chip removal on a planer.

To achieve this objective a planer of the type mentioned in the introduction is shaped in such a way according to the invention that air passage openings are provided in the part section of the chips redirecting surface which runs at an inclination and which is preferably curved in a concave manner as seen from the inlet opening with these air passage openings being connected via an air channel provided in the planer housing to the motor compartment so that an air flow from the fan wheel of the drive motor passes through the air passage openings and flows in the direction of the outlet opening.

Thus on the planer according to the invention air passage openings pass through the part section of the chips redirecting surface running at an inclination which on the known planer effects the reflection of the chips in the direction of the outlet opening and when the planer is in operation an air flow passes through these air passage openings which flows to the outlet opening. The result of this is that the chips fed by the cutter drum no longer strike the chips redirecting surface in the direction which is vertical to the cutter drum spindle but are subject to a certain redirecting in the direction of the outlet opening already before this surface is reached and may even not touch the chips redirecting surface at all as a result of the air flow passing through this. The air flow accelerates the chips which strike the chips redirecting surface in the direction of the outlet opening with a smaller amount of energy as in the case of the known planer because of the certain rerouting in the direction of the outlet opening which is effected when the chips redirecting surface is approached. Therefore an assurance is provided that not only do no chips adhere to the chips redirecting surface but that in addition all chips are conveyed with the aid of the air flow through the outlet opening out of the planer housing.

The air passage openings preferably have the shape of elongated slots which are located substantially at right angles to the extension of the shaft so as in this way to generate an air flow in the direction of the outlet opening over the complete area of the chips redirecting surface which is effective for the rerouting.

The wall areas of the boundary walls of the air passage openings which are more remote from the outlet opening can run parallel to the inlet direction of the chips into the receiving chamber and the wall areas nearer to the outlet opening can run at an inclination in the direction of the outlet opening for guiding the air flow from the air outlet openings to the outlet opening of the planer housing. As a result of the wall areas which run at an inclination the air flow is subject to a movement component in the direction of the outlet opening.

On an especially preferred embodiment of the invention the chips redirecting surface is formed by a wall area of a chips ejection insert which is inserted into the receiving chamber in a releasable manner and which is provided with a passage opening in the area of the inlet opening. On a chips ejection insert of this type the section which extends between its end located at the outlet opening and the beginning of the passage opening can be tubular so that a stable structure is provided.

It is particularly effective if, when using a chips ejection insert the planer housing is provided on opposite sides with outlet openings which form the ends of the receiving chamber so that the chips ejection insert can be inserted into the receiving chamber as desired for the use of one of the two outlet openings for the ejection of chips.

The invention will be explained in greater detail below on the basis of the Figures which illustrate an embodiment.

The illustrated planer is provided with a planer housing 1, on which a handle section 2 is formed in conventional manner from which a switch trigger element 3 protrudes and at the rear end of which a partially illustrated reinforcement sleeve 4 for the non-illustrated power supply cable leading into the handle section 2 is located. A conventional, non-displaceable, rear base plate is fitted in the rear area on the underside of the planer housing 1 and a forward base plate 6 the height position of which can be adjusted for the setting of the cutting depth in the conventional manner by means of a handle component 7 is also located on the underside. A recess 14 is provided between the two base plates 5 and 6.

The usual cutter drum 15 secured to a drum shaft 16 is rotatably disposed in the drum compartment 18 of the planer housing 1 and is located above the recess 14 so that the cutting elements provided on the cutter drum 15 come into engagement with the workpiece to be handled during the planing operation through the recess 14.

A motor compartment 19 is formed in the planer housing at approximately the same height as the drum compartment 18 although it is closed in the downward direction. An electric motor 8 with its armature shaft 9 parallel to the drum shaft 16 is secured in the motor compartment. The end of the armature shaft 9 which bears the commutator 10 is held in a bearing secured in the planer housing 1 and the corresponding end of the drum shaft 16 is also seated in a bearing which is secured in the planer housing 1. The opposite ends of armature shaft 9 and drum shaft 16 extend through bearings which are held in a gear cover 20 which is secured laterally at the planer housing 1 in a releaseable manner so that the gear cover 20 fully covers the internal space of the housing 1 laterally.

Figure 1:
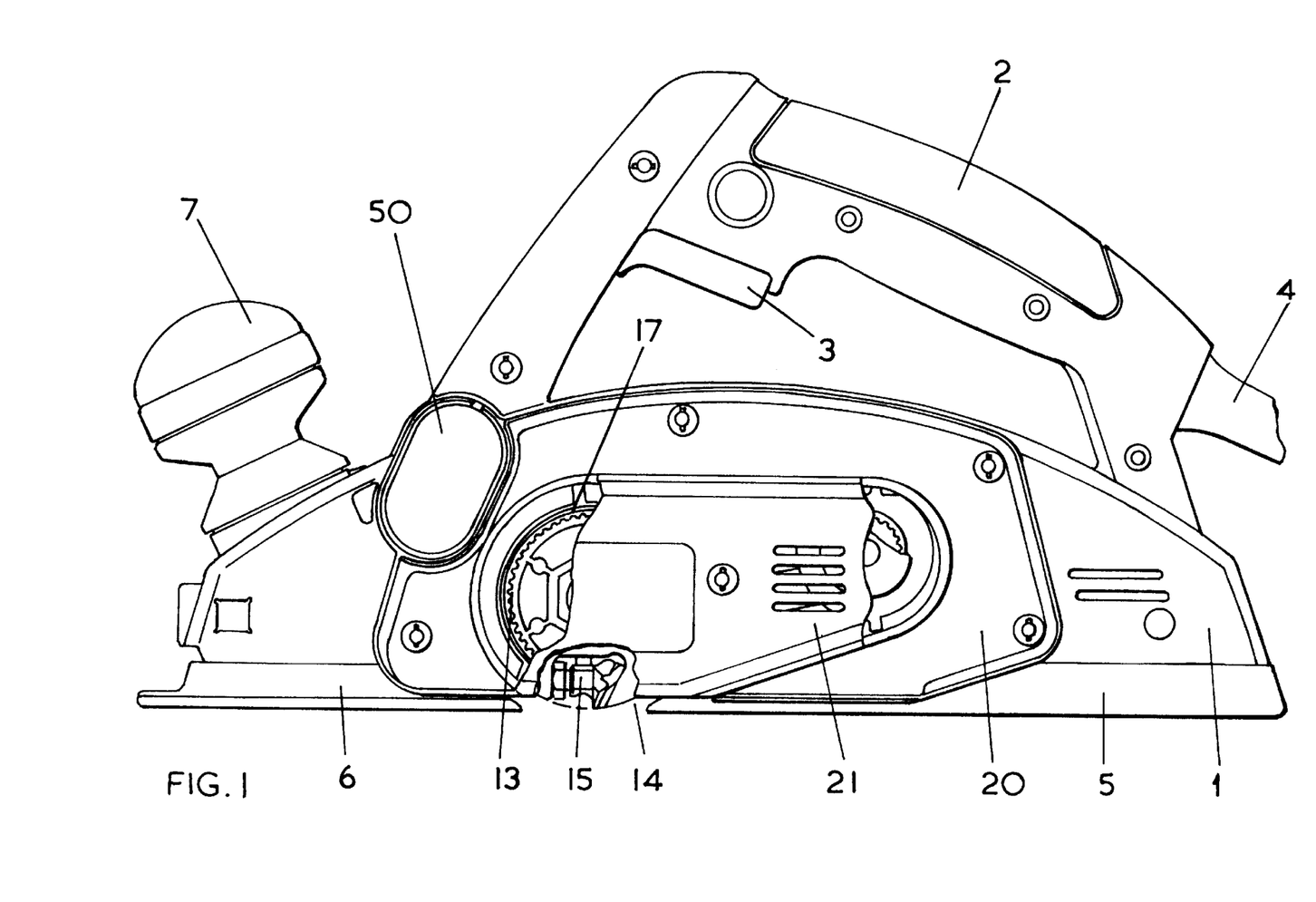
FIG. 1 shows a partially broken side view of a planer.
Figure 2:
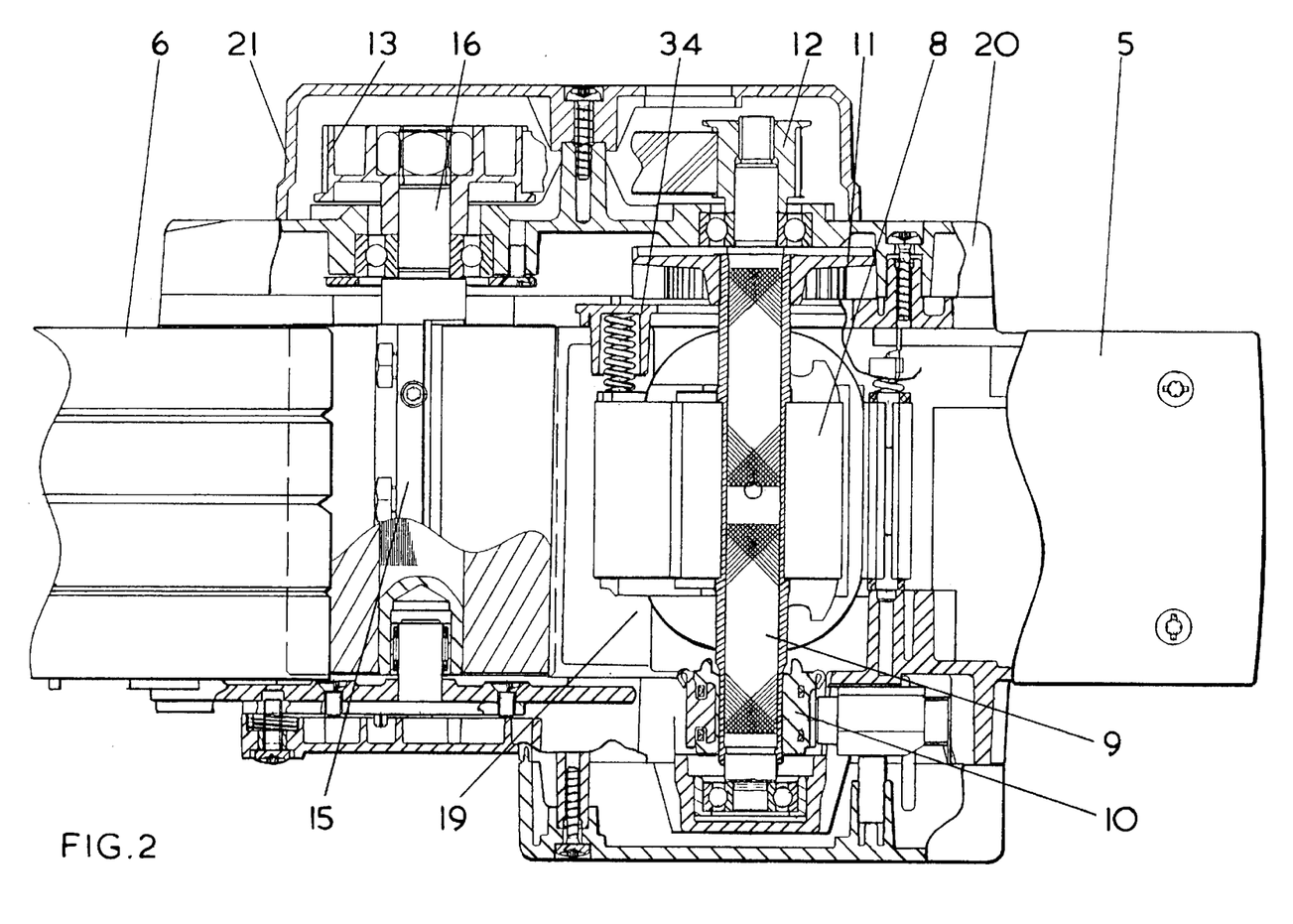
FIG. 2 shows a partially broken view from below of the planer of FIG. 1.
Figure 3:
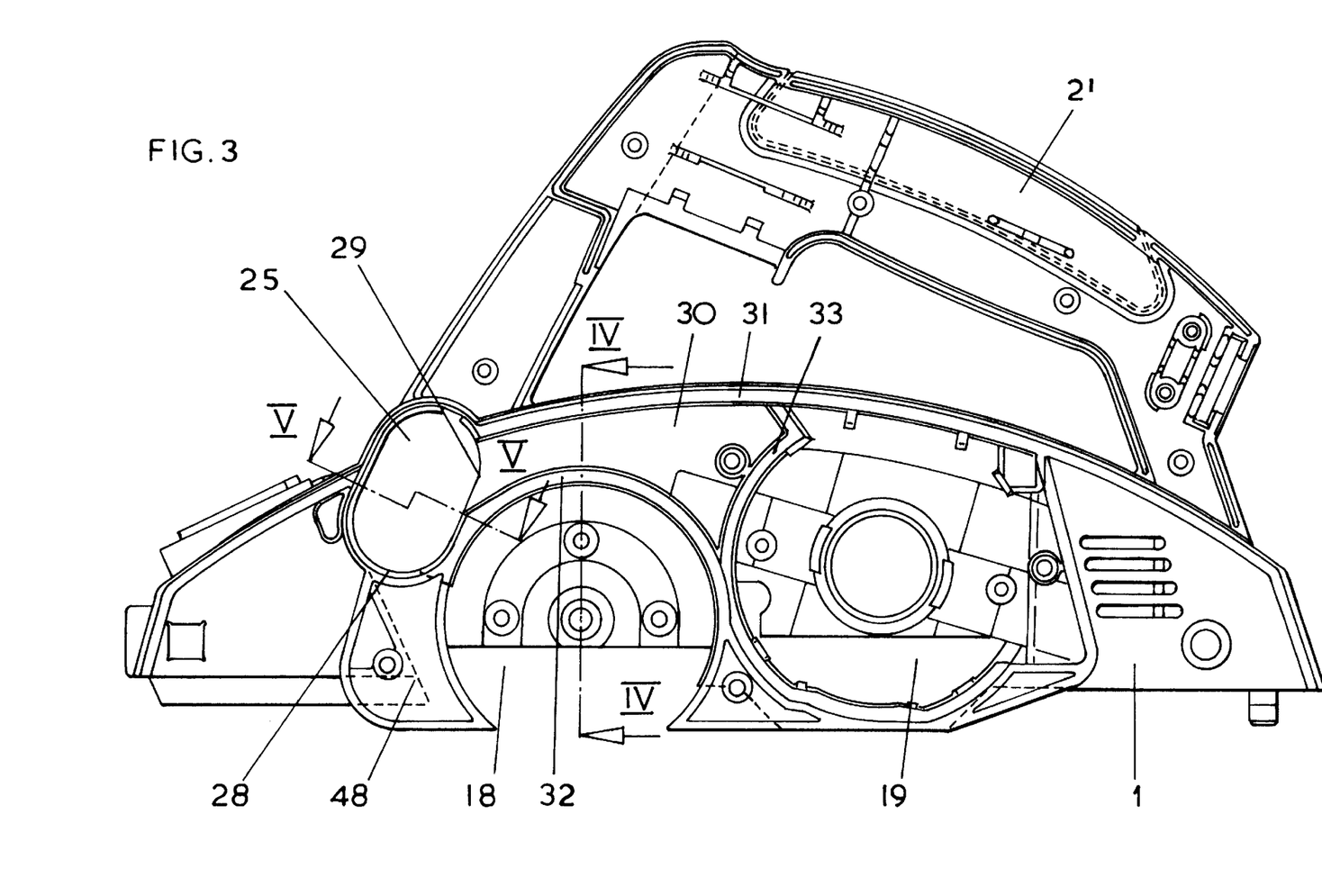
FIG. 3 shows a side view of the planer housing.
Figure 4:
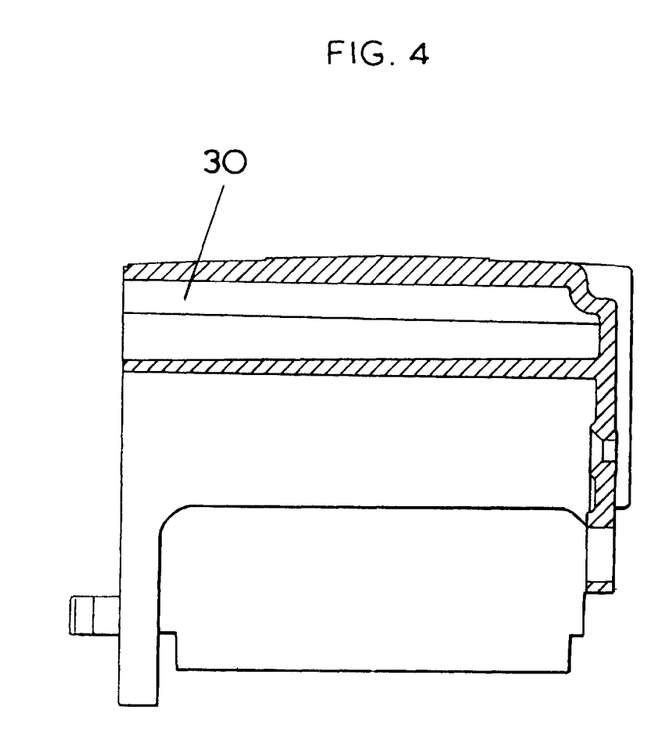
FIG. 4 shows a sectional view along the line IV—IV of FIG. 3.
Figure 5:
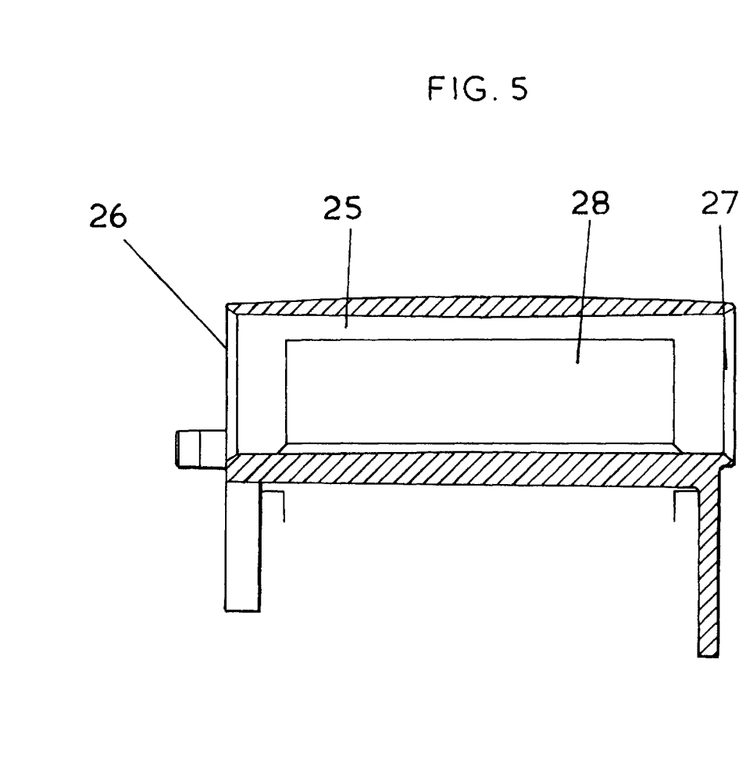
FIG. 5 shows a sectional view along the line V—V of FIG. 3.

Gear wheels 12, 13 are secured at the sections of armature shaft 9 and drum shaft 16 which protrude outwards and these gear wheels are coupled via an endless toothed belt 17 which is shown in FIG. 1 although not in FIG. 2. The gear wheels 12 and 13 and the toothed belt 17 are covered by a cover hood 21 which is secured in a releasable manner to the outside of the gear cover 20.

It will be recognised that when the electric motor 8 is activated this motor then drives the drum shaft 16 and consequently the cutter drum 15 via the toothed belt 17 so that a workpiece can be handled by means of the planer with the cutting depth being determined by the height position of the front base plate 6 related to the rear base plate 5. This structure and this method of operation of the planer are usual.

The planer housing 1 is provided in front of and slightly above the drum compartment 18 with a receiving chamber 25 which extends transversely through the housing and which forms an outlet opening 26, 27 at each side. An elongated inlet opening 28 is provided in the lower area of the receiving chamber 25. The inlet opening 28 is connected to the drum compartment 18 which in this area forms a guide wall 48 which ascends obliquely upwards and forwards, which ends at the front edge of the inlet opening 28 and which is limited on both sides by side walls.

Figure 6:
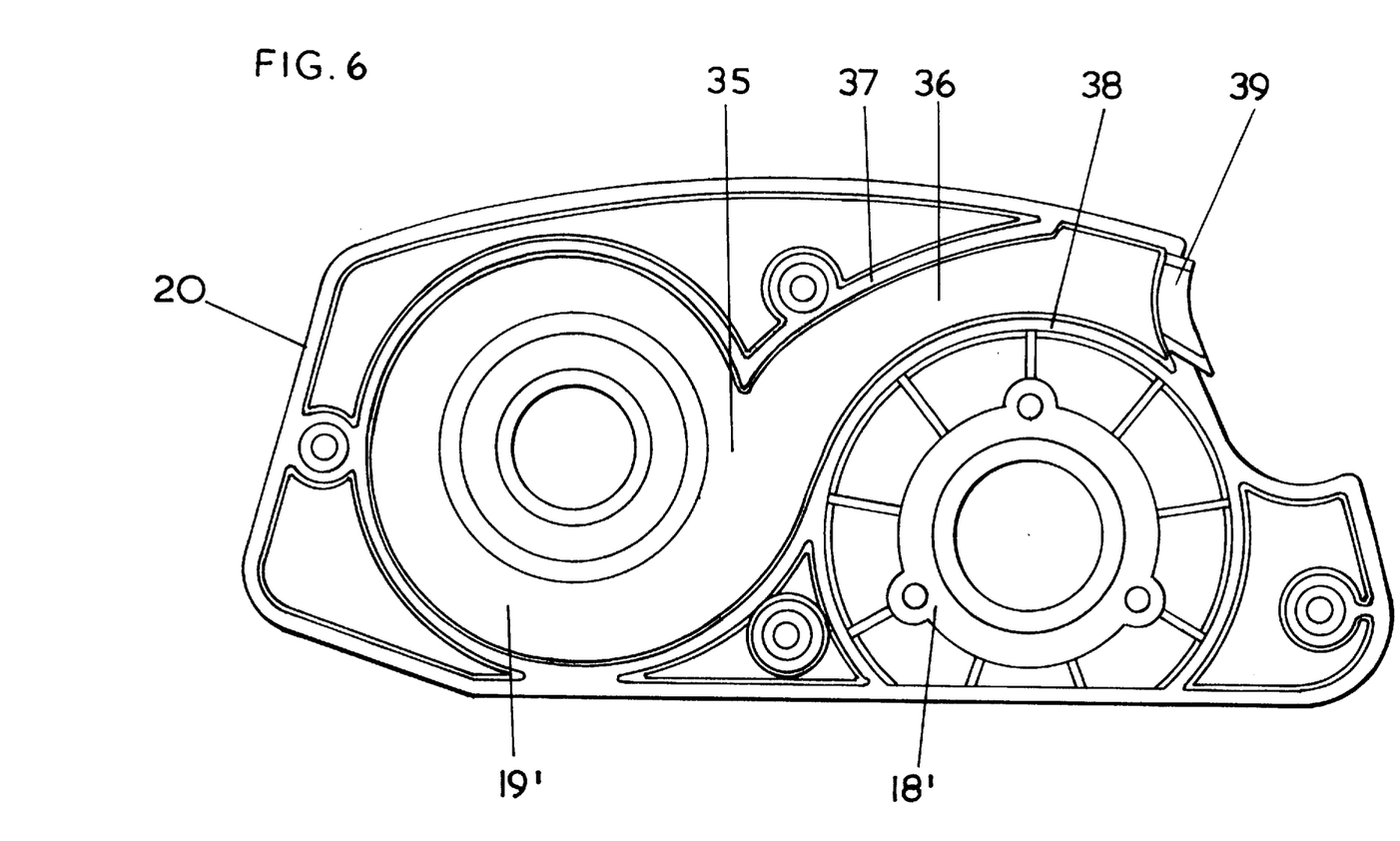
FIG. 6 shows an interior view of the gear cover of the planer shown in FIGS. 1 and 2.

An air channel 30 is formed between an upper boundary wall 31 of the planer housing 1 and a lower boundary wall 32 which at the same time represents the upper boundary wall of the drum compartment 18. This channel 30 is covered when the gear cover 20 is fitted by the upper wall area 37 and the lower wall area 38 of gear cover 20 which form a channel area 36 between them as also by the wall of the gear cover 20. At the rear end the air channel 30 is substantially closed over the largest portion of its width by the rear boundary wall 33 which also forms a portion of the boundary wall for the motor compartment 19. By these means a connection is created between motor compartment 19 and air channel 30 which, when the gear cover 20 is fitted between the rear boundary wall 33 and the cover wall of the gear cover 20 only leaves free an outlet 35 (FIG. 6), the depth of which corresponds to the height of the boundary wall which surrounds the motor recess 19' of the gear cover 20 and which with the gear cover fitted abuts the end surface of the wall of the motor compartment 19 except in the area of the rear boundary wall 33 where the outlet 35 is formed.

The opposite end i.e. the front end of the air channel 30 ends in a connection opening 29 in the receiving chamber 25. The connection opening 29 extends over a large part of the width of the receiving chamber 25 and is covered laterally by the area 39 of the gear cover 20.

As can be seen from FIG. 2 a fan wheel 11 is secured on the armature spindle 9 at the end remote from the commutator 10 this wheel in the assembled state is located inside the motor recess 19' of the gear cover 20. A wall 34, shown in FIG. 2, is located between the fan wheel 11 and the inner space of the planer housing 1. It is secured in a releaseable manner and substantially covers the complete motor recess 19' of the gear cover 20 opposite the inner space of the planer housing 1 although it leaves a free space in the area of the outlet 35. If therefore the fan wheel 11 in operation generates an air flow this will be conveyed without significant losses via the outlet 35 into the air channel 30 and from there via the connection opening 29 into the receiving chamber 25.

As shown in FIG. 1 a chips ejection insert 50 is inserted in the connection opening 29 of the planer housing 1 and is shown in detail in FIGS. 7 to 11. This chips ejection insert can be inserted as desired from one or other side of the receiving chamber 25 so that in one position its rear end wall 55 closes the outlet opening 27 of the receiving chamber 25 and the outlet opening 26 remains free whilst in the other position the rear end wall 55 closes the outlet opening 26 and the outlet opening 27 of the receiving chamber 25 remains free.

Figure 7:
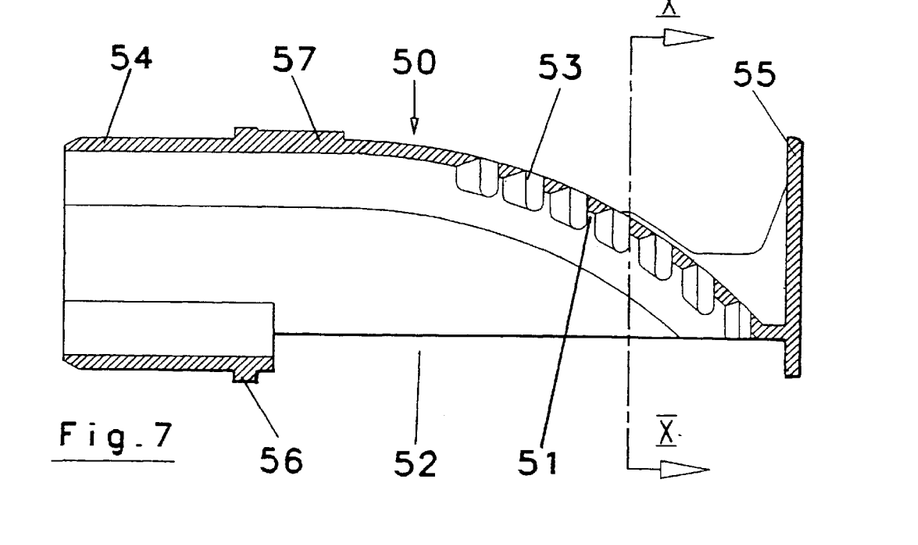
FIG. 7 shows a sectional view through the chips ejection insert of the planer shown in FIGS. 1 and 2.
Figure 8:
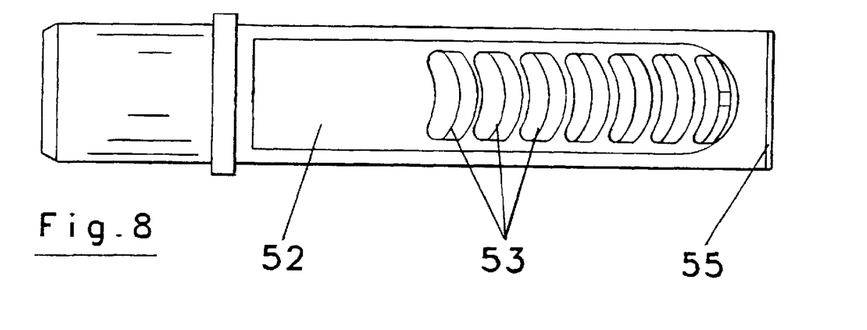
FIG. 8 shows a view of the chips ejection insert of FIG. 7 from below.
Figure 9:
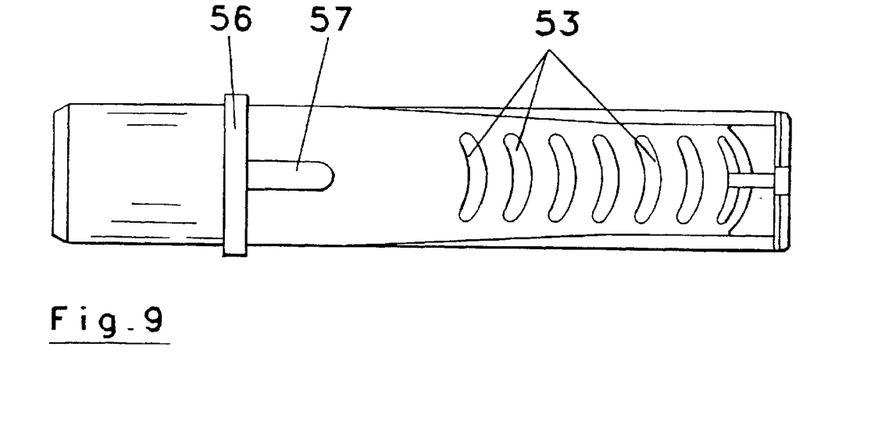
FIG. 9 shows a view of the chips ejection insert of FIG. 7 from above.
Figure 10:
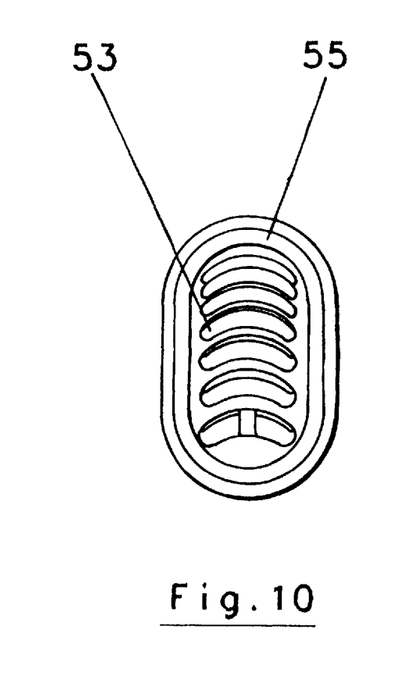
FIG. 10 shows a left-hand view of the chips ejection insert of FIG. 7.
Figure 11:
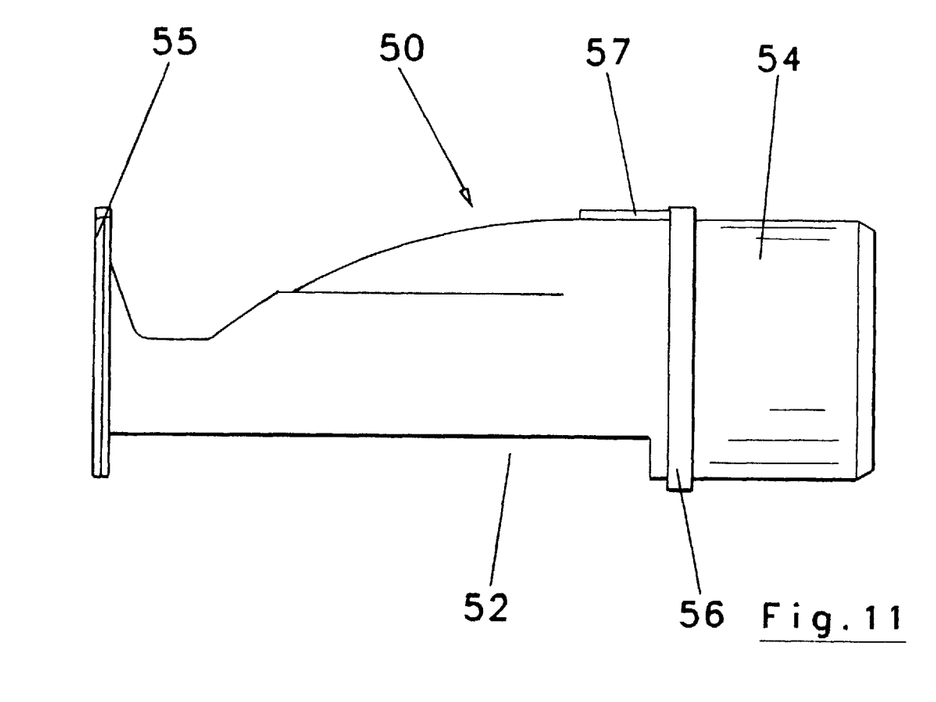
FIG. 11 shows a side view of the chips ejection insert of FIGS. 7 to 10.

The chips ejection insert 50 forms a tubular area 54 at its outlet end, i.e. its end opposite the rear end wall 55. Emanating from this area 54 an elongated passage opening 52 located between area 54 and rear end wall 55 is provided on the underside and this passage opening in the inserted condition is located in the area of the inlet opening 28 of the planer housing 1 and is preferably so dimensioned that it does not reduce the clearance of inlet opening 28. On the side opposite the passage opening 52 the wall of the chips ejection insert, as can be seen particularly from FIG. 7, is curved from an area adjacent to the rear end wall 55 in an ascending manner in the direction of the tubular area 54 and shortly before reaching the tubular area 54 changes into a wall which is in alignment with the wall of the tubular area 54. In this way the chips ejection insert 50 forms a chips redirecting surface 51 which is curved in a concave manner as seen from the passage opening 52. Slot-shaped air passage openings 53 are provided in the wall forming the chips redirecting surface 51 with the longitudinal extensions of these air passage openings being located substantially transversely to the longitudinal extension of the chips ejection insert 50 and as shown in the Figures being somewhat curved. The boundary walls of the air inlet openings 53 which are located farther away from the tubular area 54 run, as can be seen in FIG. 7, vertically to the longitudinal axis of the chips ejection insert 50, whilst the wall areas of the air passage slots 53 which are nearer to the tubular area 54 are inclined in the direction of the tubular area 54.

A position rib 56 and a position protrusion 57 are formed on the outer sides of the chips ejection insert 50 which are used for the precise positioning of the chips ejection insert 50 inside the receiving chamber 25. The position rib 56 also seals the inner space of the receiving chamber 25 which surrounds the section of the chips ejection insert 50 located between the rear end wall 55 and position rib 56 in relation to the left open outlet opening 26 or 27, respectively.

As has already been mentioned the passage opening 52 is located at the chips ejection insert 50 inserted in the receiving chamber 25 in the area of the inlet opening 28, whilst the area above the air passage openings 53 is connected to the connection opening 29 at the front end of the air channel 30. Consequently when the planer is being operated the air flow conveyed by the fan wheel 11 through the air channel 30 is pressed through the air passage openings 53 with the redirecting of the direction of flow into the inner space of the chips ejection insert 50 so that this air flow inside the chips ejection insert 50 has a significant movement component in the direction of the open end of the tubular area 54. The conveyed air is thus given off laterally to the outside laterally in the area of the outlet opening 26 or in the area of the outlet opening 27.

When the planer is being operated the cutter drum 15 in FIG. 1 is rotated clockwise so that the chips taken from the workpiece by its cutting elements are thrown in the direction of the inlet opening 28 of the receiving chamber 25 and supported by the guide wall 48 through the inlet opening 28 and the passage opening 52 into the chips ejection insert 50 and are at the same time moved in the direction of the chips redirecting surface 51. According to their kinetic energy the chips are, however, either conveyed by the air flowing through the air passage openings 53 in the direction of the outer opening of the tubular area 54 of the chips ejection insert 50 and thus to the outside without their striking the chips redirecting surface 51 or they strike the chips redirecting surface 51 with a reduction in their kinetic energy as a result of the effective air flow and are reflected by the chips redirecting surface as a result of the surface curvature in the direction of the outer opening of the tubular area 54 and taken away there by the air flow.

We claim:

1. A planer comprising:
   a planer housing comprising:
      a motor compartment;
      a drum compartment having a base plate with a recess;
      a receiving chamber having an outlet opening on at least one side of the planer housing and an inlet opening connecting the receiving chamber to the drum compartment for the intake of chips produced during the planing operation; and
      a chips redirecting surface in the receiving chamber at least approximately opposite to the inlet opening in the direction of the chip intake;
   a motor in the motor compartment;
   a fan wheel connected to the motor;
   a cutter drum in the drum compartment and having a portion of the drum periphery extending through the recess;
   a shaft coupled to the motor, rotatably supporting the drum in the drum compartment and extending parallel to the receiving chamber;
   the chips redirecting surface having at least a part section extending at an inclination in relation to the shaft;
   air passage openings located in the part section; and
   an air channel in the planer housing connecting the air passage openings to the motor compartment so that air flow from the fan wheel passes through the air passage openings and flows in the direction of the outlet opening.

2. The planer of claim 1, wherein the part section of the chips redirecting surface is curved in a concave manner when viewed from the inlet opening.

3. The planer of claim 1, wherein the air passage openings have the shape of elongated slots located substantially transversely to the extension of the shaft.

4. The planer of claim 1, wherein:
   wall areas of boundary walls of the air passage openings remote from the outlet opening run parallel to the inlet direction of the chips into the receiving chamber and
   wall areas of the boundary walls nearer to the outlet opening run at an inclination in the direction of the outlet opening.

5. The planer of claim 1, wherein the chips redirecting surface is formed by a wall area of a chips ejection insert which is inserted in a releasable manner into the receiving chamber and which is provided with a passage opening in the area of the inlet opening.

6. The planer of claim 5, wherein the chips ejection insert has a tubular portion extending between its end located at the outlet opening and the beginning of the passage opening.

7. The planer of claim 5 wherein:
   the planer housing is provided with outlet openings on opposite sides which form the ends of the receiving chamber; and
   the chips ejection insert is alternatively insertable into each of the ends of the receiving chamber for the selective use of one of the two outlet openings for the ejections of chips.

\* \* \* \* \*